Oct. 20, 1936.  W. E. MEISSNER  2,058,338
HOLLOW RIVET
Filed June 1, 1934  2 Sheets-Sheet 1
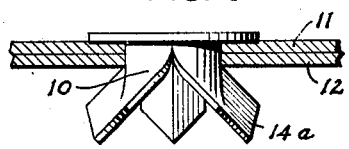
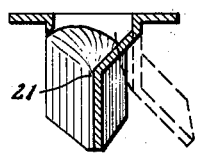
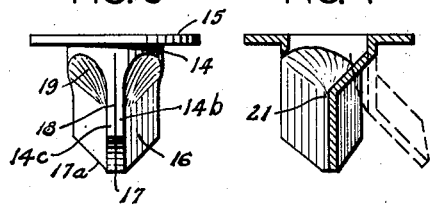
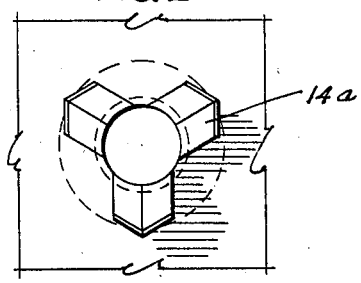
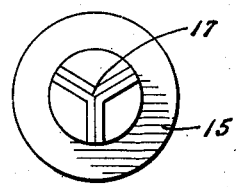
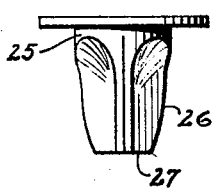
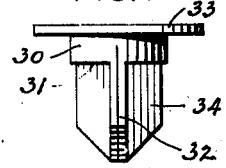
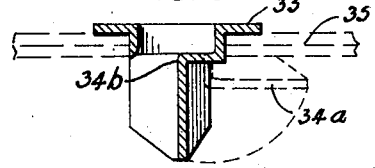
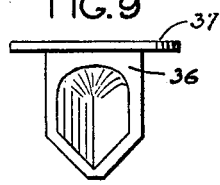
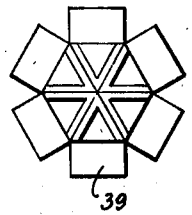
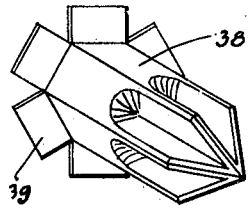
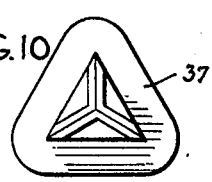
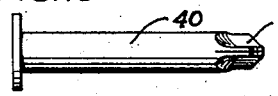
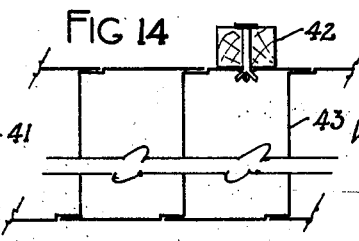
INVENTOR
WILLIAM E. MEISSNER
BY Nathaniel Ely
ATTORNEY

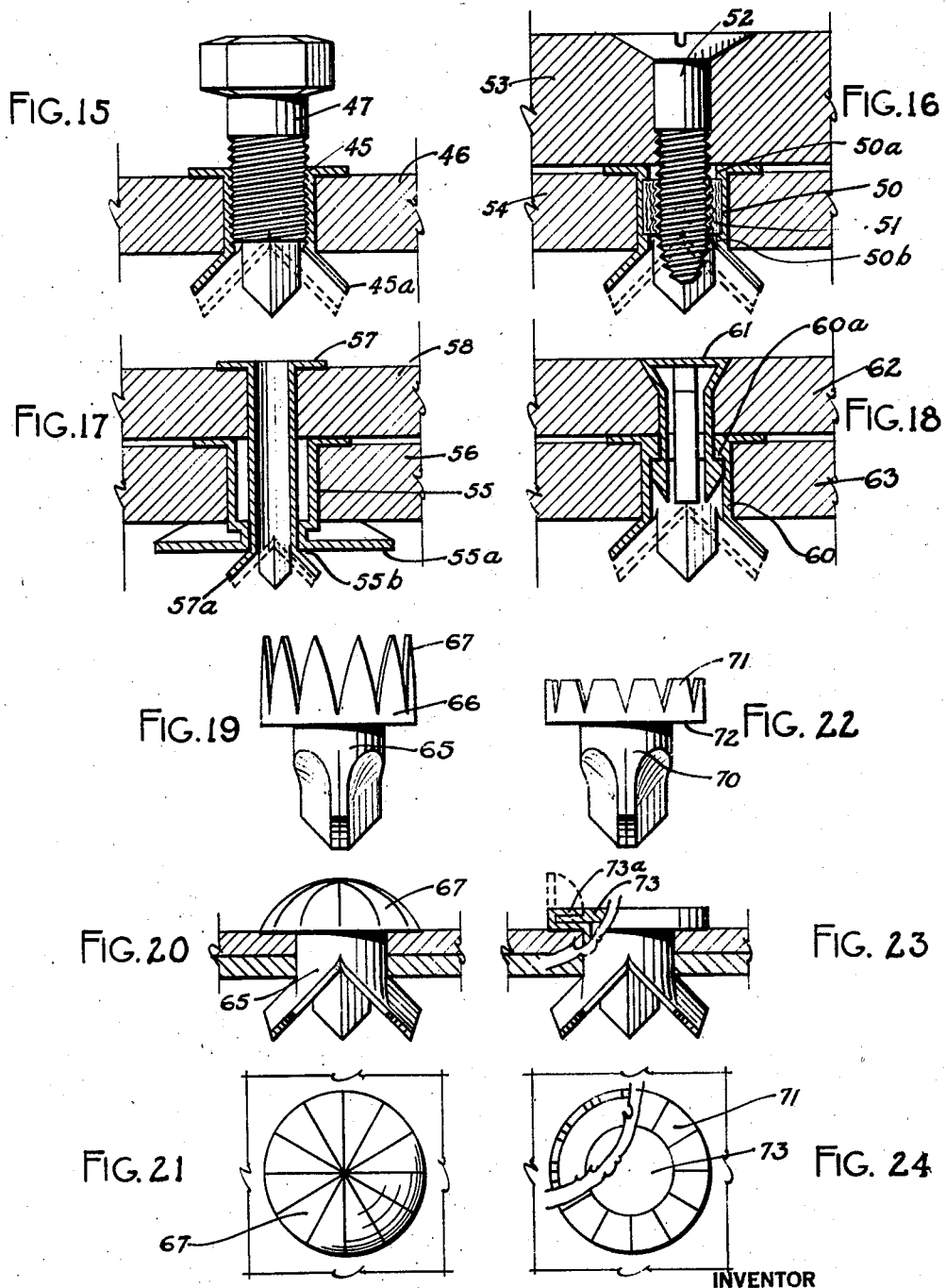

Patented Oct. 20, 1936

2,058,338

UNITED STATES PATENT OFFICE 2,058,338

HOLLOW RIVET

William E. Meissner, Newark, N. J.

Application June 1, 1934, Serial No. 728,494

10 Claims. (Cl. 85—40)

This invention relates to improvements in fastening devices and to the method of making such devices and more particularly it relates to a hollow tubular rivet adaptable for permanently securing structural members together as well as serving as an anchorage for other structural elements. It is directed to improvements in rivets of the general type as set forth in my prior application Serial Number 499,227 filed December 1, 1930 for Hollow rivet, now Patent 1,969,897, patented Aug. 14, 1934.

I have heretofore disclosed a hollow, tubular rivet which may be expanded from the side from which applied and which is applicable to locations where backing from the inside is normally impossible. Such a rivet was especially suitable for securing relatively compressible materials to relatively incompressible materials due to its being expansible from the interior to an increasingly tight condition. I now have improved and simplified such structure as well as improving the method of manufacture of this type of rivet, and I have found that the improved form of rivet has many new and special applications bringing about new and unexpected results.

One of the principal objects of my invention is to provide an expansible hollow rivet which may have a tubular or polygonal body which may be rolled, extruded or formed from a blank and in which the fluted portions are formed back to back for fewer operations and a more compact and closed pointed portion and which may have a flat or angular end to be adapted either for perforate materials in which it will act as drift pin or for driving purposes in imperforate materials.

Another object of my invention is to provide an improved securing device for permanently securing two or more materials together in which the securing device may be of relatively great wall thickness to internal diameter so that it may be driven through unperforated steel or other alloys or through wood beams and the separate pieces of material can be secured by internal expansion of the rivet from the side from which driven, and such application in a specific form is especially suitable for securing wood sleepers to steel shapes in steel frame housing.

Another object of my invention is to provide an improved type of hollow expansible rivet in which the leaf portions are so formed that they may be forced outward through an angle of 90 degrees so that the engaged material is held between parallel surfaces for greatest stress reaction.

Another object of my invention is to provide an improved type of hollow expansible rivet for construction materials in which the body portion is adapted to receive and anchor some other securing device such as a machine screw, wood screw or other securing means.

Another object of my invention is to provide a crowning or closure structure for sealing a hollow internally expansible rivet after expansion into position in which the head may be provided with projecting sections adapted to form a closed crown either with or without additional parts.

Another object of my invention is to provide a specific method for securing two or more construction materials, which may be as thin as sheets and of the same or different type, size and quality, by the use of an expansible rivet which may be expanded from the interior and in which the expansion commences at a point within the materials so that the bending action increases the tightness of the joint.

It is another object of this invention to provide an improved method of fastening and otherwise assembling brittle or soft materials like sheet rock to hard springy framework like steel by employing a fastening device that can be actuated by pressure gently applied by a tool such as a simple pin and in which the expanded parts will hold the materials with an initial tension which will not be lessened after the rivet is secured, even due to vibration.

Further objects and advantages of this invention will appear from the following description thereof taken in conjunction with the attached drawings which illustrate preferred forms of embodiment thereof and in which:

Fig. 1 is an elevational view of my improved rivet in place with the attached construction materials in cross section.

Fig. 2 is a bottom plan view of the expanded rivet as shown in Fig. 1.

Fig. 3 is a side elevation of the hollow rivet shown in Figs. 1 and 2.

Fig. 4 is a vertical cross section of the hollow rivet showing in dotted lines one leaf of the rivet in expanded form.

Fig. 5 is an end view of the closed rivet shown in Fig. 3.

Fig. 6 is a side elevation of a modified form of hollow rivet adapted for use with perforate materials.

Fig. 7 is a side elevation of a still further modified form of rivet showing the right angled crotch.

Fig. 8 is a central section through the rivet shown in Fig. 7, with parts in dotted lines to show the leaf in expanded form.

Fig. 9 is a side elevation and Fig. 10 is an end view of a modified form of tubular rivet with a triangular shank.

Fig. 11 is a bottom plan view and Fig. 12 is a perspective view of a hollow drive rivet showing a hexagonal form of shank.

Fig. 13 is a side elevation of a drive type expansible rivet for use with flooring sleepers in steel frame housing construction.

Fig. 14 is a diagrammatic vertical section of the flooring construction with the rivet shown in Fig. 13 in use.

Fig. 15 is an elevational view with parts in cross section showing a hollow drive rivet in expanded form serving as an anchor for a fastening device of the machine screw type.

Fig. 16 is an elevational view with parts in cross section showing a hollow rivet in expanded form serving as an anchor for a fastening device of the wood screw type.

Fig. 17 is a vertical section showing a hollow drive rivet in expanded form serving as an anchor for a fastening device of the expansible rivet type.

Fig. 18 is a vertical section showing a hollow drive rivet in expanded form serving as an anchorage for a snap type fastener.

Fig. 19 is an elevation of an expansible type rivet having a crown head.

Fig. 20 and Fig. 21 are respectively a side elevational view with parts in section, and a top plan view of the crown rivet of Fig. 19 in position and the crown closed.

Fig. 22 is an elevation of a modified form of closable rivet.

Fig. 23 and Fig. 24 are respectively a side elevation and a top plan view with parts broken away and parts in section of the closable rivet of Fig. 22.

Present day building construction uses many forms of securing devices of both the "wet" and "dry" types. Principally used, are nails, screws, clips, welds, and cements. I have found that I can eliminate many of these different forms thereby making for uniformity and reducing the various independent bodies of labor necessary for construction work. Furthermore, by using my special types of hollow rivet, I can use a standard structure, the stresses of which can be accurately predetermined and one in which uniform results can be obtained as it can be applied satisfactorily by unskilled labor. It also permits the use of partially fabricated sections thus materially reducing the work in the field. I have shown, hereinafter, certain special applications to indicate the range to which the rivet can be used.

The application of my preferred type of hollow expansible rivet 10 to securing two relatively thin plates, 11 and 12 is shown in Figs. 1 and 2. These materials may be initially perforate or imperforate and the rivet may be driven through and expanded from the interior and from the side from which applied by a suitable tool. More specifically, the rivet is shown in Figs. 3, 4, and 5, and consists of a tubular body portion 14 having a flanged head 15 on one end and a crimped or fluted portion 16 on the other end. The crimped portion normally comes to a point 17, especially in use with imperforate materials, the point 17 will have angular sides 17a.

The shank or body portion 14 is preferably slotted as at 18 to form separate leaf portions 14a. These leaf portions 14a are the deformable sections and are displaced out beyond the body portion 14 due to the insertion of an expanding tool (not shown) which may be a rod, plug or pin and which will contact with the inner projections 21 which is the inner edge of the fluted or crimped leaves 14a. By projecting the expansion tool through the rivet, it will be obvious that the leaf portions 14a will be forced outwardly.

I prefer to form the crimped portion of the rivet by pressing the center of the leaf portions 14a to the interior and this will result in the edges of the leaves being in back to back relationship. For example, the edge 14c of one leaf is backed against the edge 14b of the adjacent leaf. When compacted, the pointed end of the rivet will be absolutely closed and sharp, and more effective in use. This structure is shown in Fig. 5.

The uncut length of the shank 14 depends on the minimum thickness of the materials to be secured. In Fig. 3, I show this dimension to be nearly zero as the slot 18 between the leaf portions 14a, extends nearly to the head 15. I have found that this is satisfactory and that I can secure two materials as thin as #20 gauge with complete satisfaction. On the other hand, the uncut length need only be less than the combined thickness of the materials as, in order to make a tight joint, bending of the leaves 14a should commence within the material secured.

The securing action of this type of rivet is due to a large extent, to this leaf bending action. Normally, the rivet body just fits the aperture in which it is applied. For maximum expansion, the expansion tool will be just slightly smaller than the internal diameter of the rivet. Thus, on forcing the tool through the rivet, the leaves tend to bend about a theoretical line above the cut which may be termed the crotch 19. As the edges of the leaves contact with the edge of the aperture however, the leaves being at an angle, they will first tend to compress the material against the head. This action occurs regardless of any direct force on the expansion tool which can be demonstrated by the use of a thin wirelike tool such as an ice pick.

Further expansion of the leaf portions will cause a deformation of the leaf on the edge of the aperture which is due to a resultant force on an angular shape. The edges of the leaf finally bend on the end of the aperture until the action is complete. The tool may then be withdrawn. The material is then tightly clamped between the edge of the rivet and its head and under some compression. A direct pull on the head will fail to close the leaves and the relatively softer material will eventually give way. Normally the rivet is softer and the harder material will cut into the rivets under unusual load. Normal vibration however has no effect.

It will thus be seen that the simplicity of operation will permit the use of unskilled labor who can satisfactorily apply the rivet by merely driving it through the desired material, and then driving an expansion tool through the rivet. This will usually be a force normally holding the rivet tight so that when the leaves are expanded the materials will be made permanently secure. If less additional driving force is desired, as with fragile, brittle or spongy materials, I can use a thin tool, with a resultant smaller displacing force, or expand the leaves in more than one step. A thin tool, having a conical end is especially desirable in some applications where longitudinal force is objectionable. I may also use any desired form of mechanical expansion tool, bit, or other device, found suitable for the purpose. The leaves of course may be of any desired length and are usually half the total length of the rivet.

A modified form of construction shown in Fig. 6 is more especially adapted for pre-perforated materials. The rivet 25 has a multiple diameter edge portion 26 and a relatively flat end 27. Such a rivet can readily be inserted in the pre-punched hole and it will act as a drift pin to align the respective materials. When finally driven home, the larger diameter will tightly seal the holes and after expanding the leaves, the joint will be positive. Such rivets can therefore be used where welding is impossible or undesirable and the strength of the joint will be very high.

If this type of rivet or the type shown in Figs. 1-5 is to be used with partially perforated and partially imperforate materials, it will be necessary to properly gauge the holes or to drill the complete hole at the time of application. This will depend entirely on the nature of the materials and of the type of rivet used.

Another modified form of hollow rivet is shown in Figs. 7 and 8. In this form of embodiment of the device, the rivet 30 has a cylindrical shank which terminates at the crotch line 31 and is slotted along the line 32 almost to the flanged head 33. The separate leaves 34 have a right angle crotch extending into projection 34b as shown in Fig. 8. The construction material 35 which is secured by this rivet is shown in dotted lines. When the leaves are expanded to the right angle position as shown in dotted lines at 34a, they will be substantially parallel to the head flange 33. The stresses therefore are at right angles to the head flange and to the construction material and it will be impossible to dislodge the rivet.

Expansion of the leaves to this 90 degree angle is possible because of the internal projection 34b of each leaf and the insertion of a suitable expanding tool or punch will force the projection 34b to the dotted line position. In this position, beside being a stronger rivet, there is no obstruction or interference with the space behind the backed materials. It would be possible under such circumstances to run pipes, electric wire, etc. without difficulty.

The hollow type internally expansible rivet need not necessarily be of cylindrical material for it can be made of any internally open shape material. A simple and standard shape of triangular cross section is used for example to make the rivet 36 shown in Figs. 9 and 10. This rivet has the triangular head 37 and the other parts are characteristic of the previous types of rivet. The crimped portion may easily be formed in each side of the triangular body whether by die press or in any other desired manner.

The polygonal body may have any number of sides greater than three if desired. In Figs. 11 and 12 I have shown a hexagonal body portion 38 for the rivet which has the multiple part flanged head 39. Such a rivet could also be made of any standard structural shape and crimped in the preferred manner.

A multi-sided rivet has several advantages in that the multiple leaves have a smaller distance to bend in moving out of the plane of the body portion and less internal force will be required. Furthermore these rivets may be used with other than tubular holes and indicate the range to which such rivets may be used.

A tubular type of rivet that is especially suitable for driving through wood sleepers to be mounted on structural steel flooring is shown in such use in Fig. 14, the rivet itself being shown in Fig. 13. This rivet 40 is especially long and nail like but is hollow and has a short crimped end portion 41. Its wall thickness is preferably large with respect to the internal diameter and it has considerable tensile strength. The crimped point also increases its penetrating power and such a rivet does not tend to buckle under ordinary circumstances.

I find with this form of rivet that I can penetrate standard sleepers 42 and the standard steel shapes 43 used in present day steel housing. With the use of a suitable expanding tool, I can then expand the crimped end 41 so that the sleepers are held immovable. This type of structure is superior to the drive screw for no vibration will loosen such a joint and if an attempt is made to withdraw the expanded rivet, it will shear the softer material, which ever it may be.

This general type of expansible rivet is especially suitable for use as an anchorage when projected through a single material. Such a use is shown in Figs. 15 to 18 inclusive. In Fig. 15 for example, I provide a rivet 45 which is expanded in a construction material 46. This rivet may preferably hold a machine screw or bolt 47. Such a structure is especially suitable in anchoring machinery to flooring of either wood or masonry type. If the screw is sufficiently long, it will of course hold the leaves 45a in expanded position beyond the edge of the construction material. For most purposes however this is unnecessary and I do not show it in this case.

A wood screw is somewhat more difficult to anchor and in such case, I provide a rivet 50 which has a plurality of internal shoulders 50a and 50b as shown in Fig. 16. A fibre insert 51 may be placed within the body portion of the rivet and the screw 52 when in place, will hold the structural material 53 to the structural material 54. The shoulders 50a and 50b will prevent any movement of the fibre insert.

In Fig. 17 I have shown the use of two expansible rivets of my invention one of which has the right angular expansible leaves somewhat as previously shown in Fig. 7 and the other of which may be an elongated type as shown generally in Fig. 6. In this construction, the right angular crotch type of rivet 55 is first secured in the construction material 56. The leaves 55a form a shoulder 55b and the second expansible rivet 57 which is projected through the outer construction material 58 is then projected through these shoulders and expanded. This makes a positive and non-loosening joint which may be far superior to a larger rivet due to the reaction of the leaves 55a which are tensioned by the leaves 57a and it leaves a smaller hole in the outer material.

In Fig. 18 I have shown the use of an expansible rivet 60 which has an internal projection 60a to which a snap type of rivet 61 may be anchored. In this construction the structural materials 62 and 63 are also positively held although if a different snap type of rivet were used, it would be possible to have a detachable connection to a permanent anchor. It is of course also to be understood that the detachable material might be a fabric, netting, or other material and is not necessarily limited to building materials. In fact such a structure would be entirely satisfactory for securing covering to automobile frames or to any other elements to which the expansible rivet anchor could be secured.

An expansible rivet of this general type may require sealing after the expanding tool is removed. This may be accomplished in different ways and if the rivet were to be used in securing a metal lath or plaster board to a frame work, the plaster would itself close up the opening. In other cases however it may be desirable to use either an ornamental crown or a flat insert. These forms are shown in Figs. 19 to 24 inclusive.

In Figs. 19, 20, and 21, the rivet 65 has a head 66 having upstanding leaves 67 of well known shape so that when the rivet is expanded in place through the construction materials 68, they may be closed into a crown. The crown structure is shown in Figs. 20 and 21. It is usually formed by a suitable crowner or cup shaped tool, not shown.

A modified cap structure is shown in Figs. 22 to 24 inclusive in which the rivet 70 has a plurality of upstanding leaves 71 extending from the head flange 72. These are of truncated type and cooperate with the filler 73 shown in Figs. 23 and 24 to make a flat, closed joint. If desired the filler 73 may be cut away at 73a to receive the edges of the leaves 71 as shown in detail in Fig. 23 and to make an entirely flush joint.

As previously pointed out, the hollow internally expansible rivet may be made of any desired alloy or metal, of any desired size and it has a general application. The forms of embodiment herein set forth are illustrative only of certain special applications and I do not wish to be limited to these forms only. The rivet can be readily and inexpensively made in production machinery and it has certain special advantages of permanence, rigidity of joint, and self backing qualities not possessed by any other securing device known to me.

A single rivet can be used on many different combined thicknesses of material as long as the slotted side portion begins within the holes in the material and so that the leaves will begin to bend in the material to be secured. Of course, if tight joints are not desired, the slot may begin outside of the materials to be secured and then there can be relative movement between the materials within a small range.

A minimum number of forms of this rivet will be found suitable for nearly every application. I have pointed out only a few of the special types and it will be understood that these examples are merely illustrative and not to be considered as limiting the scope of my invention. It will also be understood that the size and type of metal from which the rivets are made will be subject to the usual considerations of specific design for the expected stresses on the particular application. Such rivets can be made by any desired process including pressing from tubes, drawing from flat sheets or otherwise.

The term structural material as used herein is intended to cover the common and well known structural materials whether in sheet, panel, fabricated unit or column form, and included plaster, cement, metal, wood, asbestos and similar materials including wire or wood lath, tiles, marble and imitation marble, stonework, etc.

I am aware that modifications may be made to my invention and I therefore desire to include within the scope and spirit thereof, all forms, and modifications which come within a broad interpretation of the claims appended hereinafter.

I claim:

1. A securing device of the expansible rivet type adapted for building construction which comprises a rivet having a slitted body portion, a head portion at one end of said body portion and a plurality of flutes at the other end of the body portion, said flutes being formed from the leaf sections between the respective slits and having the edge of one leaf adjacent to the edge of another leaf, and having the centers of the respective leaves in substantial internal contact whereby the insertion of a tool into said rivet will expand said leaves beyond the surface of the body portion.

2. As an article of commerce, a rivet having a hollow tubular body portion, a flange at one end thereof, and a plurality of crimped flutes at the other end, the exterior portions of said flutes converging to a point at the center with the edge of one flute in back to back relation with the edge of the adjacent flute to form a closed central point, said flutes adapted to be expanded by an expansion tool, the ends of said flutes being at an angle to the body portion whereby said rivet may be used to pierce a construction material.

3. A securing device of the expansible rivet type adapted for building construction which comprises a rivet having a slitted body portion, a head portion at one end of said body portion and a plurality of flutes at the other end of the body portion, said flutes being formed from the leaf sections between the respective slits and having the edge of one leaf adjacent to the edge of another leaf, and having the centers of the respective leaves in substantial internal contact whereby the insertion of a tool into said rivet will expand said leaves beyond the surface of the body portion, said slitted portion extending to the head portion so that minimum thickness materials may be secured.

4. A securing device of the expansible rivet type adapted for building construction which comprises a rivet having a slitted body portion, a head portion at one end of said body portion and a plurality of flutes at the other end of the body portion, said flutes being formed from the leaf sections between the respective slits and having the edge of one leaf adjacent to the edge of another leaf, and having the centers of the respective leaves in substantial internal contact whereby the insertion of a tool into said rivet will expand said leaves beyond the surface of the body portion, said body portion having a projecting means to serve as an anchorage.

5. The combination of a securing device of the expansible rivet type adapted for building construction which comprises a rivet having a slitted body portion, a head portion at one end of said body portion, and a plurality of flutes at the other end of the body portion, said flutes being formed from the leaf sections between the respective slits and having the edge of one leaf adjacent to the edge of another leaf, and having the centers of the respective leaves in substantial internal contact whereby the insertion of a tool into said rivet will expand said leaves beyond the surface of the body portion, said rivet having projecting sides on the interior and a second expanding rivet having a similar body portion and fluted end portion as the first mentioned rivet and adapted to be projected through and anchored to said first rivet.

6. A securing device of the expansible rivet type adapted for building construction which comprises a rivet having a slitted body portion, a head portion at one end of said body portion and a plurality of flutes being formed from the leaf sections between the respective slits and having the centers of the respective leaves in substantial internal contact whereby the insertion of a tool into said rivet will expand said leaves beyond the surface of the body portion, said rivet having internal shoulders adapted to receive an anchor securing device thereto.

7. A securing device of the expansible rivet type adapted for building construction which comprises a rivet having a slitted body portion, a head portion at one end of said body portion and a plurality of flutes at the other end of the body portion, said flutes being formed from the leaf sections between the respective slits and having the edge of one leaf adjacent to the edge of another leaf, and having the centers of the respective leaves in substantial internal contact whereby the insertion of a tool into said rivet will expand said leaves beyond the surface of the body portion and means to seal the open body portion of the rivet.

8. A securing device of the expansible rivet type adapted for building construction which comprises a rivet having a slitted body portion, a head portion at one end of said body portion and a plurality of flutes at the other end of the body portion, said flutes being formed from the leaf sections between the respective slits and having the edge of one leaf adjacent to the edge of another leaf, and having the centers of the respective leaves in substantial internal contact whereby the insertion of a tool into said rivet will expand said leaves beyond the surface of the body portion and means to seal the open body portion of the rivet, said sealing means including a leaf shape head on the rivet, said head leaves forming a closed crown after deformation.

9. A securing device of the expansible rivet type adapted for building construction which comprises a rivet having a slitted body portion, a head portion at one end of said body portion and a plurality of flutes at the other end of the body portion, said flutes being formed from the leaf sections between the respective slits and having the edge of one leaf adjacent to the edge of another leaf, and having the centers of the respective leaves in substantial internal contact whereby the insertion of a tool into said rivet will expand said leaves beyond the surface of the body portion, the body portion of said rivet being polygonal.

10. A securing device of the expansible rivet type adapted for building construction which comprises a rivet having a slitted body portion, a head portion at one end of said body portion and a plurality of flutes at the other end of the body portion, said flutes being formed from the leaf sections between the respective slits and having the edge of one leaf adjacent to the edge of another leaf, and having the centers of the respective leaves in substantial internal contact whereby the insertion of a tool into said rivet will expand said leaves beyond the surface of the body portion, the body portion of said rivet being triangular.

WILLIAM E. MEISSNER.